United States Patent [19]

Dudley

[11] Patent Number: 5,042,264

[45] Date of Patent: Aug. 27, 1991

[54] METHOD FOR DETECTING AND CORRECTING REVERSING VALVE FAILURES IN HEAT PUMP SYSTEMS HAVING A VARIABLE SPEED COMPRESSOR

[75] Inventor: Kevin F. Dudley, Cazenovia, N.Y.

[73] Assignee: Carrier Corporation, Syracuse, N.Y.

[21] Appl. No.: 586,129

[22] Filed: Sep. 21, 1990

[51] Int. Cl.$^5$ .................... F25B 13/00; F25B 49/00
[52] U.S. Cl. ...................... 62/126; 62/131; 62/160; 62/228.4
[58] Field of Search ............... 62/160, 125, 126, 127, 62/129, 130, 131, 158, 228.4, 228.5

[56] References Cited

U.S. PATENT DOCUMENTS

| | | | |
|---|---|---|---|
| 4,211,089 | 7/1980 | Mueller et al. ............... | 62/131 X |
| 4,232,530 | 11/1980 | Mueller ........................... | 62/160 |
| 4,246,763 | 1/1981 | Mueller et al. ............... | 62/126 X |

*Primary Examiner*—Harry B. Tanner

[57] ABSTRACT

Temperatures in the inside heat exchanger or both the inside and outside heat exchangers of a reversible vapor compression refrigeration system are sensed before and after a system startup or mode change. If the reversing valve is positioned properly, the temperature should change in a certain way because of the operating change, e.g., on a startup in cooling mode, the inside heat exchanger temperature should decrease. If the temperatures actually sensed do not change in the predicted way, it is an indication that the reversing valve is incorrectly positioned for the operating mode selected. If the temperature changes indicate that the reversing valve is out of position, the variable speed compressor is operated at its maximum speed for a short time. If the temperature change is now as expected, the valve has changed to the proper position. If the temperatures still have not changed in the way predicted, the reversing valve is still improperly positioned. This indicates a malfunctioning valve and the system is shut down.

2 Claims, 3 Drawing Sheets

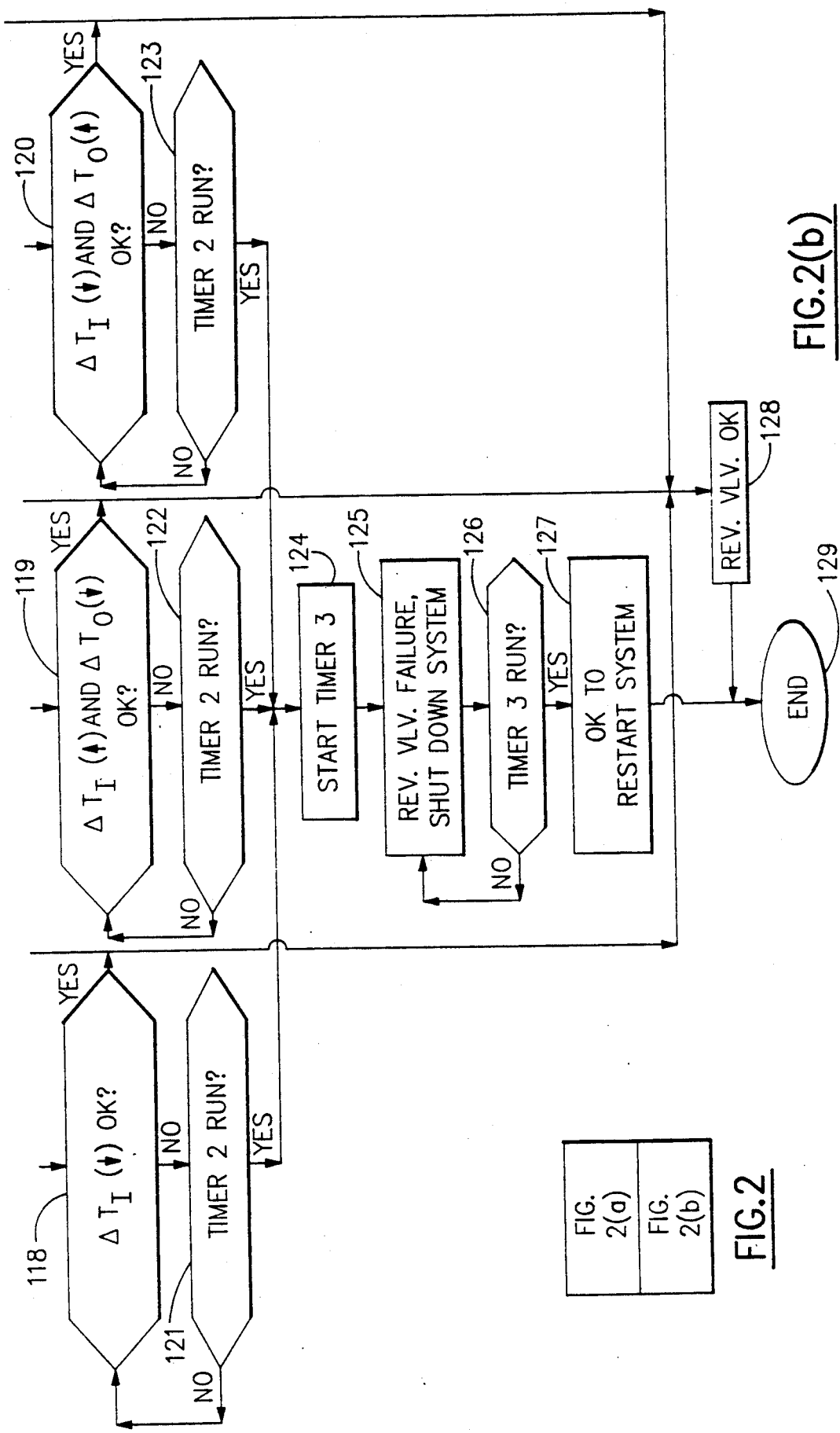

METHOD FOR DETECTING AND CORRECTING REVERSING VALVE FAILURES IN HEAT PUMP SYSTEMS HAVING A VARIABLE SPEED COMPRESSOR

BACKGROUND OF THE INVENTION

This invention relates generally to reversible vapor compression refrigeration systems, commonly known as heat pumps, having variable speed compressors. More particularly, the invention relates to a method for detecting whether, after a system startup or mode change, the system flow reversing valve is positioned properly and for taking corrective action if it is not.

Reversible vapor compression refrigeration systems are widely used for space heating and cooling in a variety of applications. In the typical heat pump system, the refrigerant flow reversal required to change between the system cooling and heating modes is accomplished by a two position, four way or reversing valve. The reversing valve directs hot refrigerant from the compressor discharge to the outside heat exchanger during operation in the cooling mode and to the inside heat exchanger during operation in the heating mode. When the system is operating in the heating mode and the outside heat exchanger is functioning as the evaporator, frost can build up on the external surfaces of the heat exchanger, inhibiting heat transfer. Heat pump systems therefore usually have, in addition to a cooling and a heating mode, a defrost mode of operation. In the defrost mode, the refrigerant flow in the system is aligned as it is in the cooling mode, with hot refrigerant being directed to the outside heat exchanger, for a period sufficient to melt any frost buildup. There are a variety of defrost control schemes and methods in use.

In most heat pump systems used in buildings, the heat pump compressor is driven by an electric motor. Advances in motor control technology have led to the availability of variable speed motors, enabling their use to power fans and compressors in refrigeration systems such as heat pumps. Variable speed components allow for reduced system radiated noise during periods of light demand on the system, increased system efficiency and energy savings.

Most heat pump system flow reversing valves are solenoid actuated and pressure operated, depending on pressure differentials in the system to change from one position to the other. If these pressure differentials are reduced, as may be case when the system compressor is operating at some speed less than its maximum, the reversing valve may fail to operate or stick in some intermediate position between the heating mode position and the cooling mode position when commanded to shift positions in response to a system mode change. Improper operation of the reversing valve can seriously degrade system performance.

What is needed, therefore, is a means for detecting the position of the reversing valve in a heat pump system and for insuring that the valve is in the proper position.

SUMMARY OF THE INVENTION

The present invention fulfills the need stated above by a method that is simple, reliable and inexpensive.

Rather than directly determining the position of the reversing valve, the method indirectly determines valve position by measuring temperatures in the inside heat exchanger or both the inside and outside heat exchangers before and after a system startup or mode change. If the reversing valve is positioned properly, the temperatures should change in a certain way because of the operating change. If the temperatures actually sensed do not change in the predicted way, it is an indication that the reversing valve is incorrectly positioned for the operating mode selected. If the temperature changes indicate that the reversing valve is out of position, the variable speed compressor is operated at its maximum speed for a short time. With the compressor operating at its highest speed, the differential pressures used to operate the reversing valve are at their maximum and the valve should become properly positioned. The same temperatures are sensed again and compared to those sensed before the startup or mode change. If the temperature change is now as expected, the valve has changed to the proper position. If the temperatures still have not changed in the way predicted, the reversing valve is still improperly positioned. This indicates a malfunctioning valve and the system is shut down.

The method of the invention requires no additional equipment beyond that which is found in most modern residential and commercial heat pump systems.

BRIEF DESCRIPTION OF THE DRAWINGS

The accompanying drawings are a part of the specification.

FIGS. 2(a) and 2(b), taken together as shown in FIG. 2, depict a logic flow chart showing the method of the invention.

DESCRIPTION OF THE PREFERRED EMBODIMENT

Figure 1:
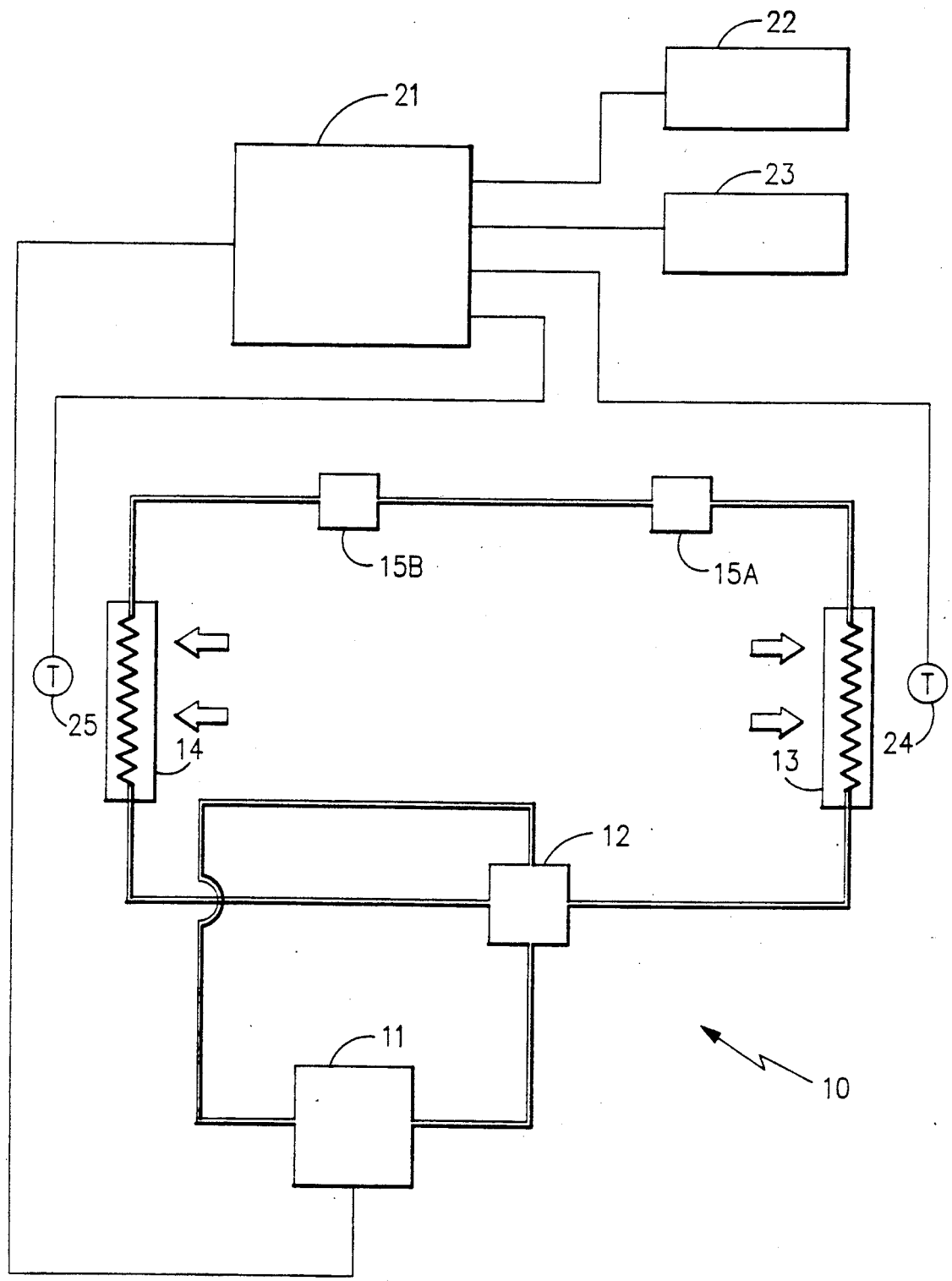
FIG. 1 is a block diagram of a heat pump system adapted for practicing the method of the invention.

FIG. 1 is a block diagram of a heat pump system that incorporates the features necessary to practice the invention. In FIG. 1 is shown heat pump system 10 System 10 comprises compressor 11, four way or reversing valve 12, inside heat exchanger 13, outside heat exchanger 14 and expansion devices 15A and 15B, all interconnected by an appropriate system of refrigerant piping.

In the heating mode of operation, reversing valve 12 is aligned so that refrigerant flows from the discharge of compressor 11 through valve 12 to inside heat exchanger 13, Which in this mode functions as the condenser, then through expansion devices 15A and 15B, then through outside heat exchanger 14, functioning as the evaporator, then through valve 12 to the suction of compressor 11.

In the cooling and defrost modes of operation, reversing valve 12 is aligned so that refrigerant flows from the discharge of compressor 11 through valVe 12 to outside heat exchanger 13, in this mode functioning as the condenser, then through expansion devices 15B and 15A, then through inside heat exchanger 14, functioning as the evaporator, then through valve 12 to the suction of compressor 11. Each of expansion devices 15A and 15B is a single device or a combination of devices offering little or no resistance to refrigerant flow in one direction and metering or restricting refrigerant flow in the other direction. The devices are installed so that the one directly upstream in the refrigerant flow path from the heat exchanger that is functioning as the evaporator is metering or restricting flow while the other device is offering low flow resistance.

System controller 21 can be one or a combination of components, including a microprocessor, that controls the operation of the system, including the speed of compressor 11. Thermostat 22 senses the temperature in the space served by the system and sends signals to system controller 21 when heating or cooling is required. Defrost controller 23 determines when, during operation in the heating mode, to shift to and from the defrost mode. Temperature sensors 24 and 25 are located in inside and outside heat exchangers 13 and 14, respectively. Each sensor provides signals to system controller 21 that are a measure of the temperature in its heat exchanger.

The principle underlying the method of the invention is that the temperatures in the two heat exchangers of the system will change in a known way when the operating mode of the system is changed. If the actual temperature changes observed does not conform to those expected, it is an indication that the flow reversing valve has failed to operate properly. For example, if a heat pump system is operating in the heating mode and then the operating mode is changed to cooling or defrost, it can be expected that the temperature in the inside heat exchanger will decrease and the temperature in the outside heat exchanger will increase. If the reversing valve does not operate, the expected temperature changes will not occur. By measuring the temperatures in the heat exchangers before and after the mode shift, the functioning of the reversing valve can be monitored and corrective action can be initiated if required.

Figure 2A:
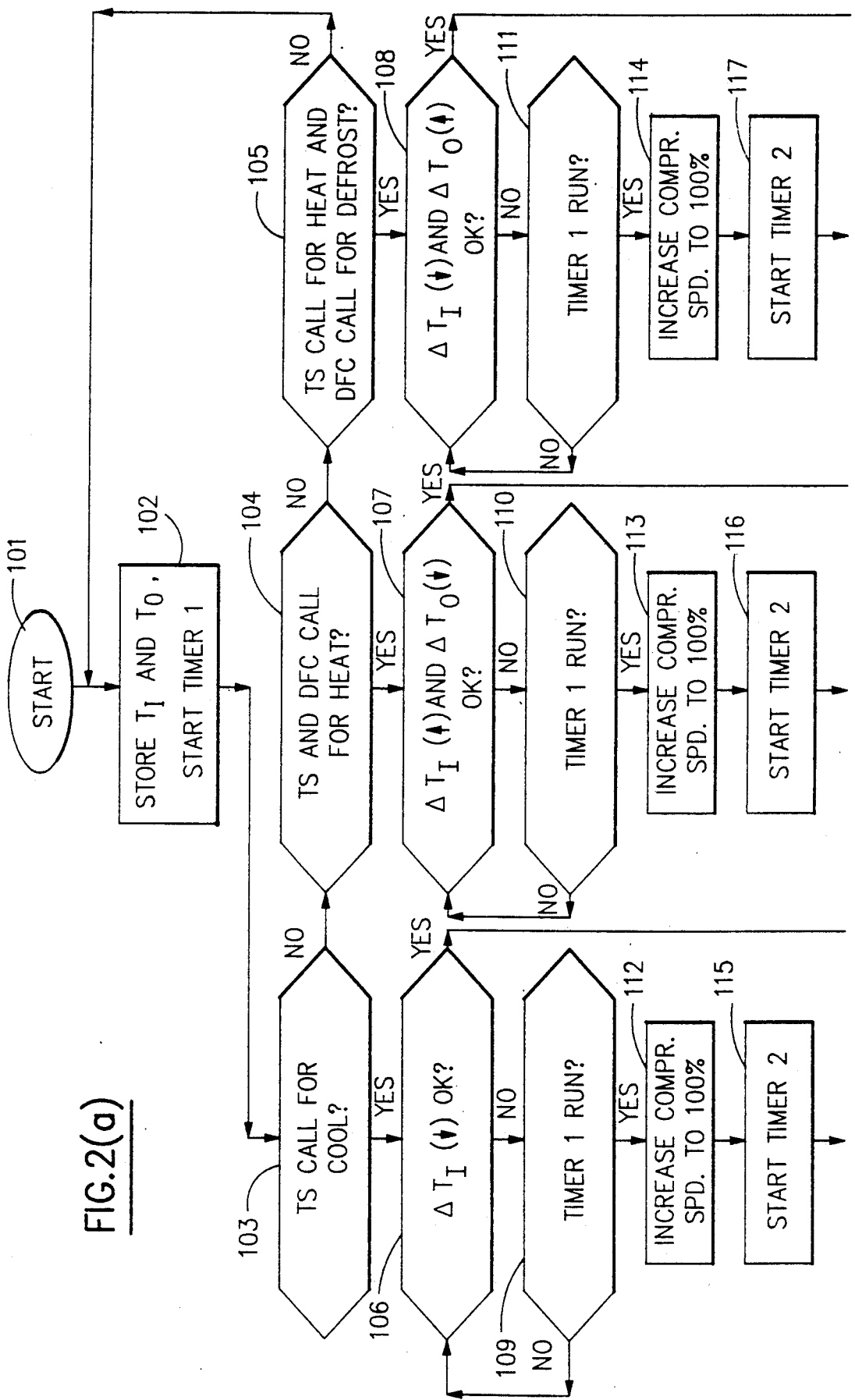

The method of the invention can best be described by reference to FIGS. 2(a) and 2(b), which taken together as shown in FIG. 2, depict a logic flow chart for implementing the method. In the chart, the following abbreviations are used:

$T_I$—Inside heat exchanger temperature
$T_O$—Outside heat exchanger temperature
TS—Thermostat
DFC—Defrost Mode Controller.

Timers 1, 2 and 3 are preset interval timers or timer subroutines in the system controller. The preset times of the three timers are a design choice based on the characteristics of specific heat pump systems but should be on the order of a few minutes.

Startup in cooling mode or shift from heating to cooling mode.

On startup in the cooling mode (101) and before the compressor is started, initial values of $T_I$ and $T_O$ are sensed and stored and Timer 1 is started (102). Since the thermostat is calling for cooling, there will be a YES at 103. Then for the interval set in Timer 1, the system controller will measure $T_I$ and compare it to the stored initial value of $T_I$ (106 and 109). A decrease in $T_I$ of more than a predetermined and preset value (on the order of a few degrees) within the time interval set in Timer 1 indicates that the system reversing valve is properly positioned for the cooling mode (YES at 106) and the logic path is complete (106 to 128 to 129). If the reversing valve is not properly positioned, the preset value of the decrease in $T_I$ will not be reached before the preset interval in Timer 1 runs out (NO at 106 and YES at 109). The system controller will then set the compressor speed to maximum (112). Then for the interval set in Timer 2, the controller will measure $T_I$ and compare it to the stored initial value of $T_I$ (115, 118 and 121). A decrease in $T_I$ of at least the preset value indicates that the increase in compressor speed has been effective in properly positioning the reversing valve (YES at 118) and the logic path is complete (118 to 128 to 129). Failure to achieve the preset temperature change value within the preset time (YES at 121) indicates that there is a reversing valve failure and the system should be shut down (121 to 124 to 125).

Shift from heating to defrost mode

Before the mode shift, initial values of $T_I$ and $T_O$ are sensed and stored and Timer 1 is started (101 and 102). When the defrost controller signals the need for a defrosting cycle there will be NOs at 103 and 104 and a YES at 105. Then for the interval set in Timer 1, the system controller will measure $T_I$ and $T_O$ and compare them to the stored initial values (108 and 111). A decrease in $T_I$ and an increase in $T_O$ of more than the predetermined and preset values (on the order of a few degrees) within the time interval set in Timer 1 indicates that the system reversing valve is properly positioned for the defrost mode (YES at 108) and the logic path is complete (108 to 128 to 129). If the reversing Valve is not properly positioned, the preset values of the decrease in $T_I$ and increase in $T_O$ will not be reached before the preset interval in Timer 1 runs out (NO at 108 and YES at 111). The system controller will then set the compressor speed to maximum (114). Then for the interval set in Timer 2, the controller will measure $T_I$ and and $T_O$ compare them to the stored initial values (117, 120 and 123). A decrease in $T_I$ and an increase in $T_O$ of at least the preset values indicate that the increase in compressor speed has been effective in properly positioning the reversing valve (YES at 120) and the logic path is complete (120 to 128 to 129). Failure to achieve the preset temperature change values within the preset time (YES at 123) indicates that there is a reversing valve failure and the system should be shut down (123 to 124 to 125).

Startup in heating mode or shift from either cooling or defrost to heating mode

Before the startup or mode shift, initial values of $T_I$ and $T_O$ are sensed and stored and Timer 1 is started (101 and 102). The thermostat signals the need for heat and the defrost controller is not signalling for a defrosting cycle, thus there will be a NO at 103 and YES at 104. Then for the interval set in Timer 1, the system controller will measure $T_I$ and $T_O$ and compare them to the stored initial values (107 and 110). An increase in $T_I$ and a decrease in $T_O$ of more than the predetermined and preset values (on the order of a few degrees) within the time interval set in Timer 1 indicates that the system reversing valve is properly positioned for the heating mode (YES at 107) and the logic path is complete (107 to 128 to 129). If the reVersing valve is not properly positioned, the preset values of the increase in $T_I$ and decrease in $T_O$ will not be reached before the preset interval in Timer 1 runs out (NO at 107 and YES at 110). The system controller will then set the compressor speed to maximum (113). Then for the interval set in Timer 2, the controller will measure $T_I$ and and $T_O$ compare them to the stored initial values (116, 119 and 122). An increase in $T_I$ and a decrease in $T_O$ of at least the preset values indicate that the increase in compressor speed has been effective in properly positioning the reversing valve (YES at 119) and the logic path is complete (119 to 128 to 129). Failure to achieve the preset temperature change values within the preset time (YES at 122) indicates that there is a reversing valve failure and the system should be shut down (122 to 124 to 125).

A lockout prevents restarting the system for a period after a shut down due to a reversing valve failure (124 to 126 to 127 to 129). The above method is readily adaptable to use in a heat pump system having suitable sensors and controls by an appropriate program in the system microprocessor or other means.

What is claimed is:

1. In a reversible vapor compression refrigeration system having a pressure operated flow reversing valve, a variable speed compressor and at least a heating and a cooling mode of operation, a method for detecting and correcting failures of said valve to be properly positioned, on system startup or change in operating mode, comprising the steps of:

sensing and storing, in a memory device, a first heat exchanger temperature signal;

sensing and storing, in a memory device, a second heat exchanger temperature signal after said startup or mode shift;

comparing said first and said second heat exchanger temperature signals and deriving a first temperature difference between them;

determining whether said first temperature difference is consistent with a predetermined value equal to the temperature difference expected upon system startup or mode change in a system with said reversing valve properly positioned;

operating said variable speed compressor at its maximum speed for a preset period, if said first temperature difference is not consistent with said expected temperature change;

sensing and storing, in a memory device, a third heat exchanger temperature signal;

comparing said first and said third heat exchanger temperature signals and deriving a second temperature difference between them; and continuing system operation, if said second temperature difference is consistent with said expected temperature change.

2. The method of claim 1 comprising the additional step of shutting down said system, if said second temperature difference is not consistent with said expected temperature difference.

* * * * *